(12) United States Patent
Choi et al.

(10) Patent No.: US 9,288,854 B2
(45) Date of Patent: Mar. 15, 2016

(54) BACKLIGHT UNIT AND DISPLAY DEVICE HAVING THE SAME

(71) Applicant: Samsung Display Co., Ltd., Yongin (KR)

(72) Inventors: Min-Soo Choi, Asan-si (KR); Kyunho Kim, Cheonan-si (KR); Eun Chul Shin, Cheonan-si (KR); Hwanwoong Lee, Asan-si (KR); Taegon Im, Siheung-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 297 days.

(21) Appl. No.: 13/904,367

(22) Filed: May 29, 2013

(65) Prior Publication Data

US 2014/0145626 A1    May 29, 2014

(30) Foreign Application Priority Data

Nov. 29, 2012    (KR) .......................... 10-2012-0137169

(51) Int. Cl.
| | | |
|---|---|---|
| *H05B 37/00* | (2006.01) | |
| *H05B 39/00* | (2006.01) | |
| *H05B 41/00* | (2006.01) | |
| *H05B 33/08* | (2006.01) | |

(52) U.S. Cl.
CPC ........ *H05B 33/0815* (2013.01); *H05B 33/0827* (2013.01); *Y02B 20/347* (2013.01)

(58) Field of Classification Search
CPC .................................................. H05B 33/0183
USPC ................................................ 315/186–193
See application file for complete search history.

(56) References Cited

U.S. PATENT DOCUMENTS

| | | | | |
|---|---|---|---|---|
| 7,859,868 B2* | 12/2010 | Huang | .............. | H02M 3/33592 363/53 |
| 7,928,670 B2 | 4/2011 | Chen et al. | | |
| 8,035,315 B2 | 10/2011 | Zhao et al. | | |
| 2008/0111800 A1* | 5/2008 | Wang | .................... | G09G 3/3406 345/204 |
| 2008/0211426 A1* | 9/2008 | Kuo | ..................... | H05B 41/282 315/282 |
| 2009/0109165 A1* | 4/2009 | Park | ..................... | G09G 3/3426 345/102 |
| 2010/0013412 A1 | 1/2010 | Archibald et al. | | |

(Continued)

FOREIGN PATENT DOCUMENTS

| | | |
|---|---|---|
| KR | 10-0952499 | 4/2010 |
| KR | 10-1028860 | 4/2011 |

(Continued)

*Primary Examiner* — Sibin Chen
*Assistant Examiner* — Metasebia Retebo
(74) *Attorney, Agent, or Firm* — H.C. Park & Associates, PLC

(57) ABSTRACT

In a display device, a backlight unit including a power converter configured to generate a light source driving voltage in response to a voltage control signal, a plurality of light emitting diode strings each configured to receive the light source driving voltage through an end thereof, and a controller connected to the other end of each of the plurality of light emitting diode strings and configured to generate a plurality of current control signals used to control a current flowing through each of the plurality of light emitting diode strings and the voltage control signal. The controller is configured to generate the voltage control signal in response to a current control signal from among the plurality of current control signals, which is applied to a light emitting diode string configured to receive a lowest forward driving voltage among the plurality of light emitting diode strings.

18 Claims, 9 Drawing Sheets

(56) References Cited

U.S. PATENT DOCUMENTS

| | | |
|---|---|---|
| 2010/0327835 A1 | 12/2010 | Archibald |
| 2011/0164069 A1 | 7/2011 | Thompson et al. |
| 2011/0248648 A1* | 10/2011 | Liu ..................... G09G 3/3406 315/294 |
| 2012/0001557 A1 | 1/2012 | Hagino et al. |
| 2012/0074859 A1 | 3/2012 | Kong et al. |
| 2012/0133291 A1 | 5/2012 | Kitagawa et al. |
| 2012/0146531 A1 | 6/2012 | Uchimoto et al. |
| 2012/0248997 A1* | 10/2012 | Jung et al. ..................... 315/192 |
| 2012/0280632 A1* | 11/2012 | Kim ................... H05B 33/0815 315/192 |

FOREIGN PATENT DOCUMENTS

| | | |
|---|---|---|
| KR | 10-2011-0072692 | 6/2011 |
| KR | 10-2011-0135750 | 12/2011 |
| KR | 10-1129287 | 3/2012 |

* cited by examiner

BACKLIGHT UNIT AND DISPLAY DEVICE HAVING THE SAME

CROSS-REFERENCE TO RELATED APPLICATION

This application claims priority from and the benefit of Korean Patent Application No. 10-2012-0137169, filed on Nov. 29, 2012, which is hereby incorporated by reference for all purposes as if fully set forth herein.

BACKGROUND

1. Field

Exemplary embodiments of the present invention relate to a backlight unit and a display device having the backlight unit.

2. Discussion of the Background

As one of several kinds of user interfaces, a display device is required to be employed in electronic devices, and a flat-panel display device is widely used as the display is device for lightweight, slimness, and low power consumption of the electronic devices.

A liquid crystal display, which is generally referred to as the flat-panel display device, controls an amount of light provided thereto from an external source to display an image. That is, because certain liquid crystal displays are not self-emissive, they include a separate light source, i.e., a backlight unit including a backlight lamp.

In recent years, a light emitting diode (LED) has been widely used as the light source because it possesses several advantages, such as low power consumption, environment-friendly features, slim design, etc. However, the LED has a disadvantage regarding the optical design required to maintain uniformity of brightness and color of the display device, and a special technique is required to momentarily control electrical current flowing through the LED.

In addition, the backlight unit includes plural LED strings to secure sufficient brightness in the display device, but the LED strings have high power consumption.

SUMMARY

Exemplary embodiments of the present invention provide a backlight unit having reduced power consumption.

Exemplary embodiments of the present invention also provide a display device having the backlight unit.

Additional features of the invention will be set forth in the description which follows, and in part will be apparent from the description, or may be learned by practice of the invention.

An exemplary embodiment of the present invention discloses a backlight unit including a power converter configured to generate a light source driving voltage in response to a is voltage control signal, a plurality of light emitting diode strings each configured to receive the light source driving voltage through an end thereof, and a controller connected to the other end of each light emitting diode string and configured to generate a plurality of current control signals used to control a current flowing through each light emitting diode string and the voltage control signal. The controller is configured to generate the voltage control signal in response to a current control signal among the current control signals which is applied to a light emitting diode string configured to receive a lowest forward driving voltage among the light emitting diode strings.

An exemplary embodiment of the present invention also discloses a device including a display panel that includes a plurality of pixels, a driving circuit configured to control the display panel such that an image is displayed on the display panel, and a backlight unit configured to supply a light to the display panel. The backlight unit includes a power converter configured to generate a light source driving voltage in response to a voltage control signal, a plurality of light emitting diode strings each configured to receive the light source driving voltage through an end thereof, and a controller connected to the other end of each light emitting diode string and configured to generate a plurality of current control signals used to control a current flowing through each light emitting diode string and the voltage control signal. The controller is configured to generate the voltage control signal in response to a current control signal among the current control signals, which is applied to a light emitting diode string receiving a lowest forward driving voltage among the light emitting diode strings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
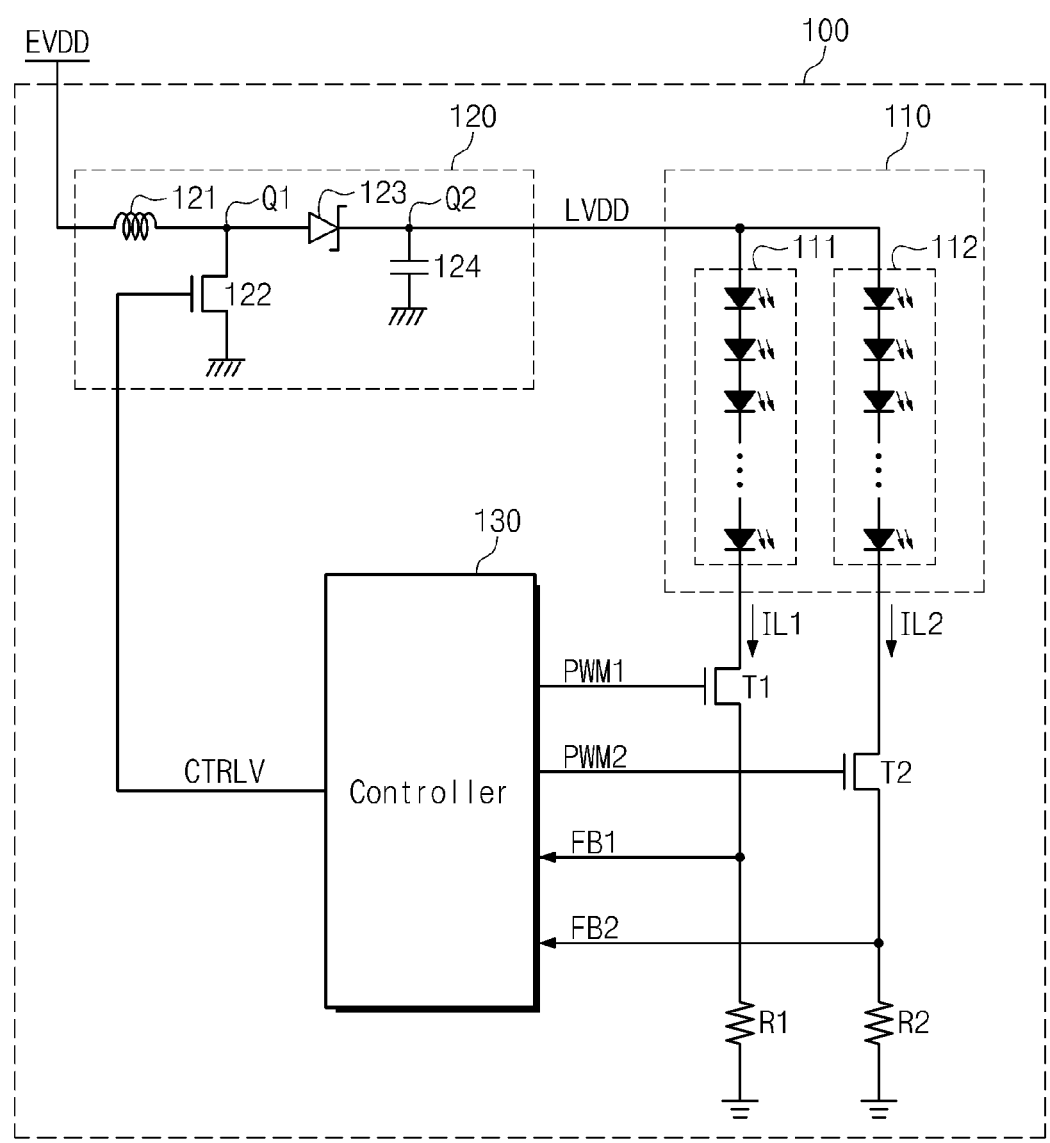
FIG. 1 is a circuit diagram showing a backlight unit according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

FIG. 1 is a circuit diagram showing a backlight unit according to an exemplary embodiment of the present invention.

Referring to FIG. 1, a backlight unit 100 includes a light source 110, a power converter 120, a controller 130, a plurality of resistors R1 and R2, and a plurality of transistors T1 and T2. Each of the plurality of resistors R1 and R2 is a pull-down resistor. The backlight unit 100 is used as a light source of a display panel of a liquid crystal display that requires the light source. In the present exemplary embodiment, the backlight unit 100 employed in the display panel will be described, but it should not be limited to the display panel. That is, the backlight unit 100 may be used in various fields, e.g., an illumination device, a commercial image board, etc.

The light source 110 includes a plurality of light emitting diode (LED) strings 111 and 112. In the present exemplary embodiment, the light source 110 includes two LED strings 111 and 112, but the light source 110 may include three or more LED strings.

Each of the LED strings 111 and 112 includes a plurality of LEDs connected to each other in series. Each LED includes a white LED emitting a white light, a red LED emitting a red light, a blue LED emitting a blue light, and a green LED emitting a green light. The white, red, blue, and green LEDs have different light emitting characteristics from each other, e.g., forward driving voltages (Vf) of the LEDs. To reduce power consumption, the LEDs may be driven by a low forward driving voltage (Vf). In addition, in order to secure uniformity of brightness, a deviation of the forward driving voltage (Vf) may be made small. In the present exemplary embodiment, the light source 110 includes the LED strings 111 and 112 each including the LEDs, but the LEDs may be replaced with laser diodes or carbon nano tubes.

An end of each of the LED strings 111 and 112 is connected to a light source driving voltage LVDD from the power converter 120. The other end of each of the LED strings 111 and 112 is connected to a corresponding transistor of the transistors T1 and T2. The transistor T1 is connected between the other end of the LED string 111 and an end of the resistor R1 and includes a gate terminal controlled by a current control signal PWM1. The transistor T2 is connected between the other end of the LED string 112 and an end of the resistor R2 and includes a gate terminal controlled by a current control signal PWM2. The other end of each of the resistors R1 and R2 is grounded.

The power converter 120 is configured to convert a source voltage EVDD from is an exterior to the light source driving voltage LVDD. The light source driving voltage LVDD has a voltage level high enough to drive the LEDs of the LED strings 111 and 112.

The power converter 120 includes an inductor 121, an NMOS transistor 122, a diode 123, and a capacitor 124. The inductor 121 is connected between the source voltage EVDD and a node Q1. The NMOS transistor 122 is connected between the node Q1 and ground. The NMOS transistor 122 includes a gate electrode configured to receive a voltage control signal CTRLV from the controller 130. The diode 123 is connected between the node Q1 and a node Q2. In the present exemplary embodiment, the diode 123 may be a Schottky diode. The capacitor 124 is connected between the node Q2 and ground. The light source driving voltage LVDD at the node Q2 is applied to the end of each of the LED strings 111 and 112.

The power converter 120 having the above-mentioned configuration is configured to convert the source voltage EVDD to the light source driving voltage LVDD. In particular, the NMOS transistor 122 is turned on or off in response to the voltage control signal CTRLV applied to the gate electrode of the NMOS transistor 122, and thus the voltage level of the light source driving voltage LVDD is controlled.

The controller 130 is configured to receive a current flowing through a node at which the transistor T1 and the resistor R1 are connected to each other as a feedback signal FB1 and is configured to output the current control signal PWM1 to the gate terminal of the transistor T1. The controller 130 is configured to receive a current flowing through a node at which the transistor T2 and the resistor R2 are connected to each other as a feedback signal FB2 and is configured to output the current control signal PWM2 to the gate terminal of the transistor T2.

The transistor T1 is turned on or off in response to the current control signal PWM1. The current flowing through the LED string 111 is controlled by the turn on and off of is the transistor T1. The transistor T2 is turned on or off in response to the current control signal PWM2. The current flowing through the LED string 112 is controlled by the turn on and off of the transistor T2.

The resistors R1 and R2 compensate for non-uniform voltage distribution between the LED strings 111 and 112. That is, one of the resistors R1 and R2, which has relatively low resistance, is connected to the LED string of the LED strings 111 and 112 that requires a relatively high forward driving voltage Vf, and the other one of the resistors R1 and R2 which has relatively high resistance, is connected to the other LED string of the LED strings 111 and 112 that requires a relatively low forward driving voltage Vf. Accordingly, a total power consumed in the LED strings 111 and 112 and the resistors R1 and R2 may be uniform.

The controller 130 is configured to output the voltage control signal CTRLV on the basis of the current control signals PWM1 and PWM2 generated by the feedback signals FB1 and FB2, thereby controlling the voltage level of the light source driving voltage LVDD.

Figure 2:
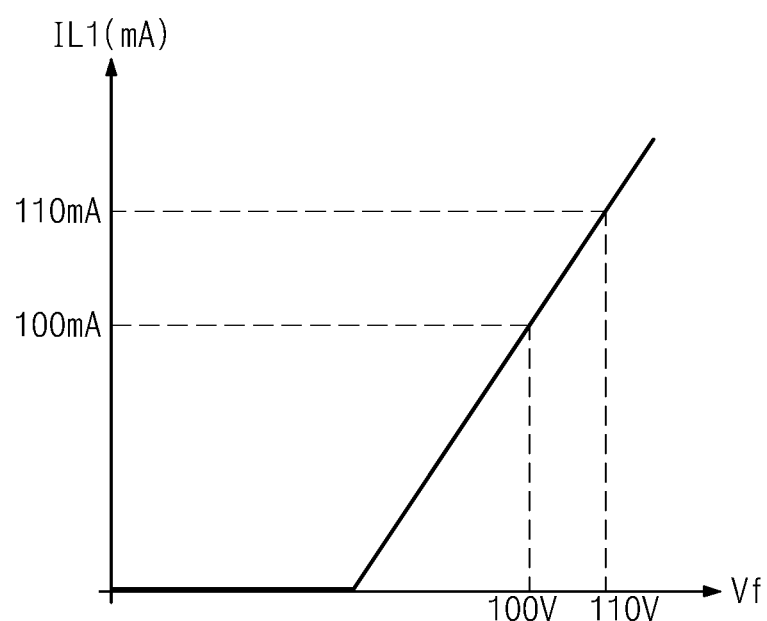
FIG. 2 is a graph showing a current-voltage characteristic of an LED string shown in FIG. 1.
Figure 3:
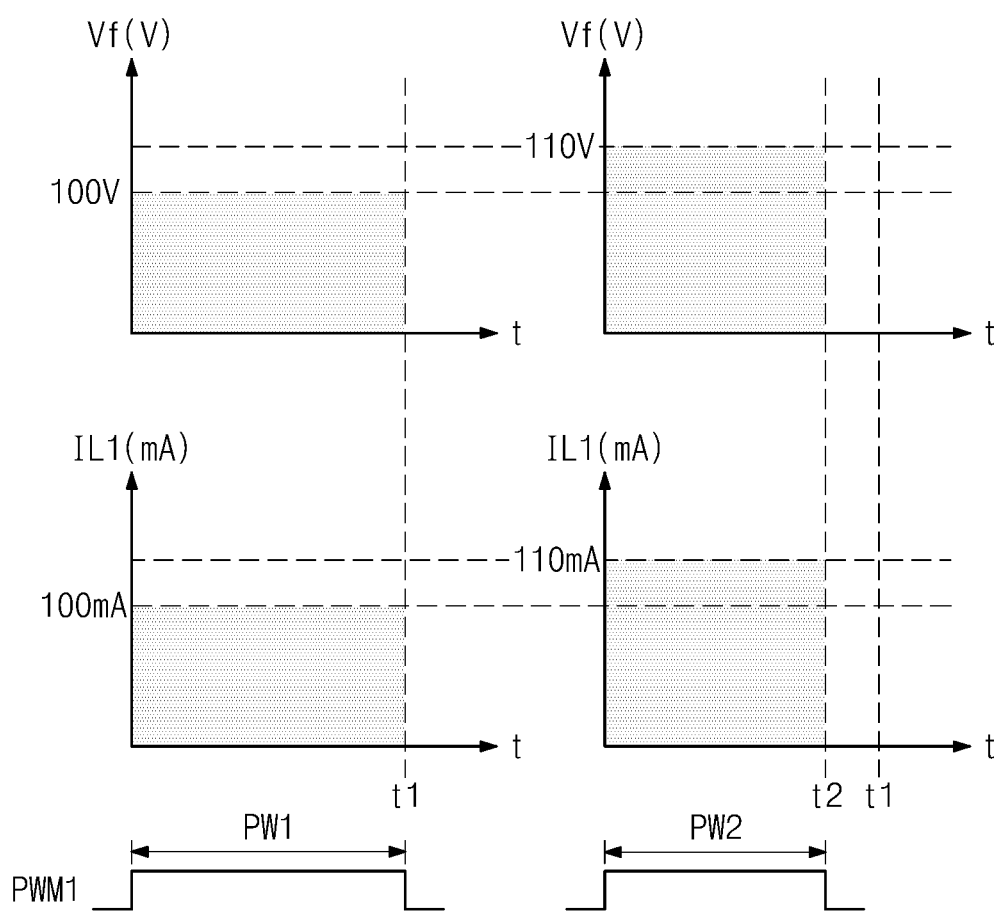
FIG. 3 is a view showing a variation of power consumption according to the current-voltage characteristic of the LED string shown in FIG. 2.

FIG. 2 is a graph showing a current-voltage characteristic of an LED string shown in FIG. 1, and FIG. 3 is a view showing a variation of power consumption according to the current-voltage characteristic of the LED string shown in FIG. 2.

Referring to FIGS. 1 and 2, when the forward driving voltage Vf of the LED string 111 is about 100 volts, the current IL1 flowing through the LED string 111 is about 100 mA, and when the forward driving voltage Vf of the LED string 111 is about 110 volts, the current IL1 flowing through the LED string 111 is about 110 mA.

Referring to FIGS. 1 and 3, although the forward driving voltage Vf of the LED string 111 differs from the forward driving voltage Vf of the LED string 112, current flowing through the LED strings 111 and 112 should be controlled to allow the LED strings 111 and 112 is to have the same brightness. Thus, the current flowing through the LED strings 111 and 112 may be controlled by the turn on and off of the transistors T1 and T2.

For instance, in a case that the current IL1 of about 100 mA flows through the LED string 111 during a time period t1 when the forward driving voltage Vf of the LED string 111 is about 100 volts, the current IL1 of about 110 mA flows through the LED string 111 during a time period t2 when the forward driving voltage Vf of the LED string 111 is about 110 volts. Thus, the brightness may be uniformly maintained. In this case, the time period t1 is greater than the time period t2 (t1>t2). For instance, when t1 is 1, t2 may be obtained by multiplying t1 by 0.909.

When the forward driving voltage Vf is about 100 volts, power consumption P1 is represented by the following equation 1:

$$P1=100 \text{ V} \times 100 \text{ mA} \times 1.0 = 10 \text{ W} \qquad \text{Equation 1}$$

When the forward driving voltage Vf is about 110 volts, power consumption P2 is represented by the following equation 2:

$$P2=110 \text{V} \times 110 \text{ mA} \times 0.909 = 10.99 \text{ W} \qquad \text{Equation 2}$$

That is, a pulse width of the current control signal PWM1 applied to the gate electrode of the transistor T1 is narrower when the forward driving voltage Vf is about 110 volts than that when the forward driving voltage Vf is about 100 volts (PW1>PW2), and the power is consumption is greater when the forward driving voltage Vf is about 110 volts than that when the forward driving voltage Vf is about 100 volts (P1<P2).

Therefore, when the light source driving voltage LVDD is applied to allow the pulse width of the current control signals PWM1 and PWM2 to be maximum, the power consumption of the backlight unit 100 may be reduced.

Figure 4:
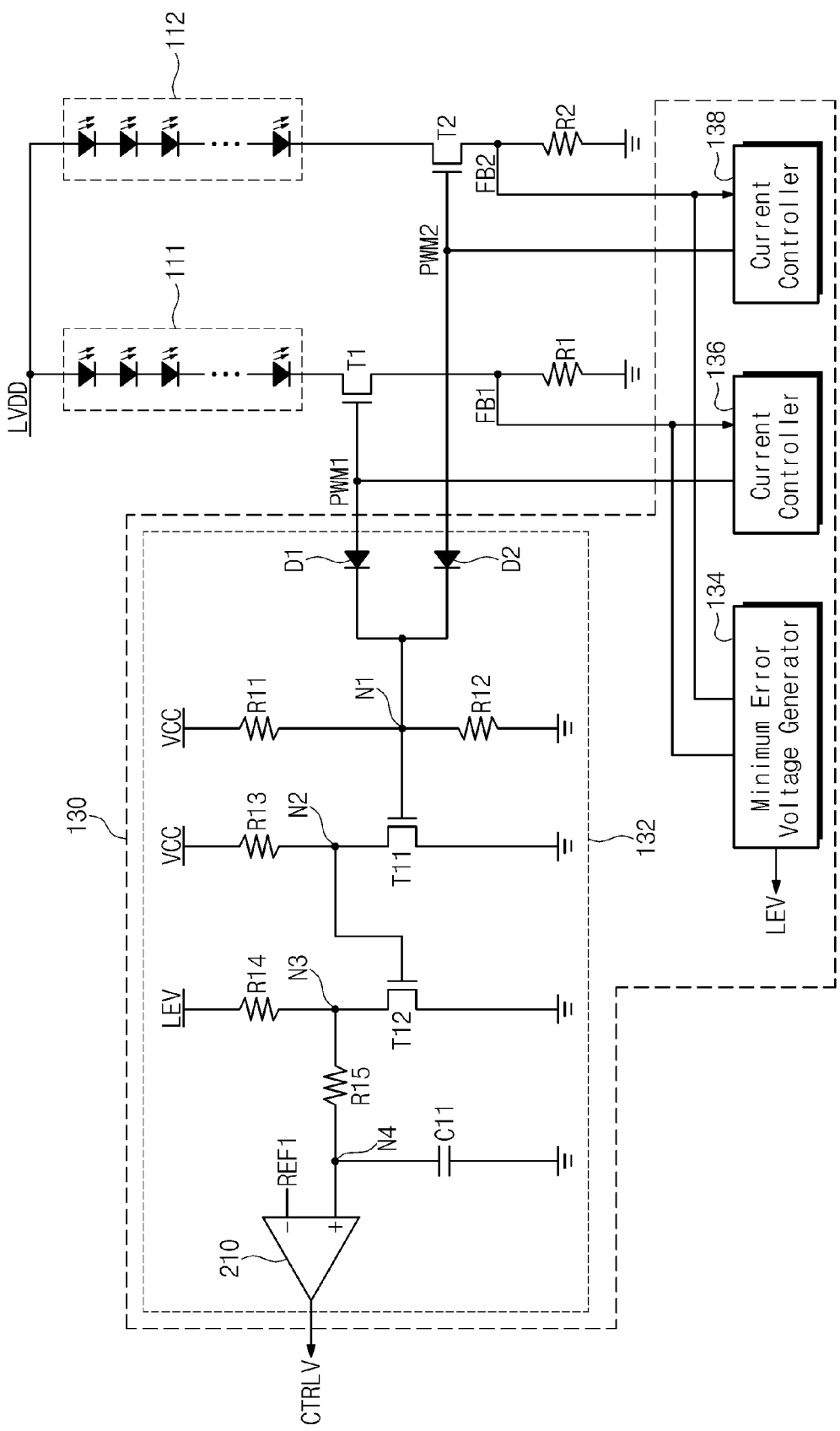
FIG. 4 is a circuit diagram showing the controller shown in FIG. 1.

FIG. 4 is a circuit diagram showing the controller shown in FIG. 1.

Referring to FIG. 4, the controller 130 includes a voltage control signal generator 132, a minimum error voltage generator 134, and current controllers 136 and 138. The voltage control signal generator 132 is configured to generate the voltage control signal CTRLV corresponding to the current control signal of the current control signals PWM1 and PWM2 that has the widest pulse width.

The minimum error voltage generator 134 is configured to receive the feedback signals FB1 and FB2 and to generate a minimum error voltage LEV corresponding to the feedback signal of the feedback signals FB1 and FB2 that has the lowest voltage level.

The current controller 136 is configured to receive a corresponding feedback signal FB1 of the feedback signals FB1 and FB2 and to generate the current control signal PWM1. The current controller 138 is configured to receive a corresponding feedback signal FB2 of the feedback signals FB1 and FB2 and to generate the current control signal PWM2.

The voltage control signal generator 132 includes diodes D1 and D2, resistors R11 to R15, a capacitor C11, transistors T11 and T12, and a comparator 210. Each of the plurality of resistors R11 and R15 is a pull-down resistor. An anode terminal of each of the diodes D1 and D2 is configured to receive a corresponding current control signal of the current control signals PWM1 and PWM2 output from the current controllers 136 and 138. A cathode terminal of each of the diodes D1 and D2 is connected to a first node N1. The resistor R11 is connected between a source voltage VCC and the first node N1. The resistor R12 is connected between the first node N1 and ground. The resistor R13 is connected between the source voltage VCC and a second node N2. The transistor T11 is connected between the second node N2 and ground and includes a gate electrode connected to the first node N1. The resistor R14 is connected between the minimum error voltage LEV and a third node N3. The transistor T12 is connected between the third node N3 and ground and includes a gate electrode connected to the second node N2. The resistor R15 is connected between the third node N3 and a fourth node N4. The capacitor C11 is connected between the fourth node N4 and ground. The comparator 210 is configured to receive a first reference voltage REF1 and a voltage of the fourth node N4 and to output the voltage control signal CTRLV.

Figure 5:
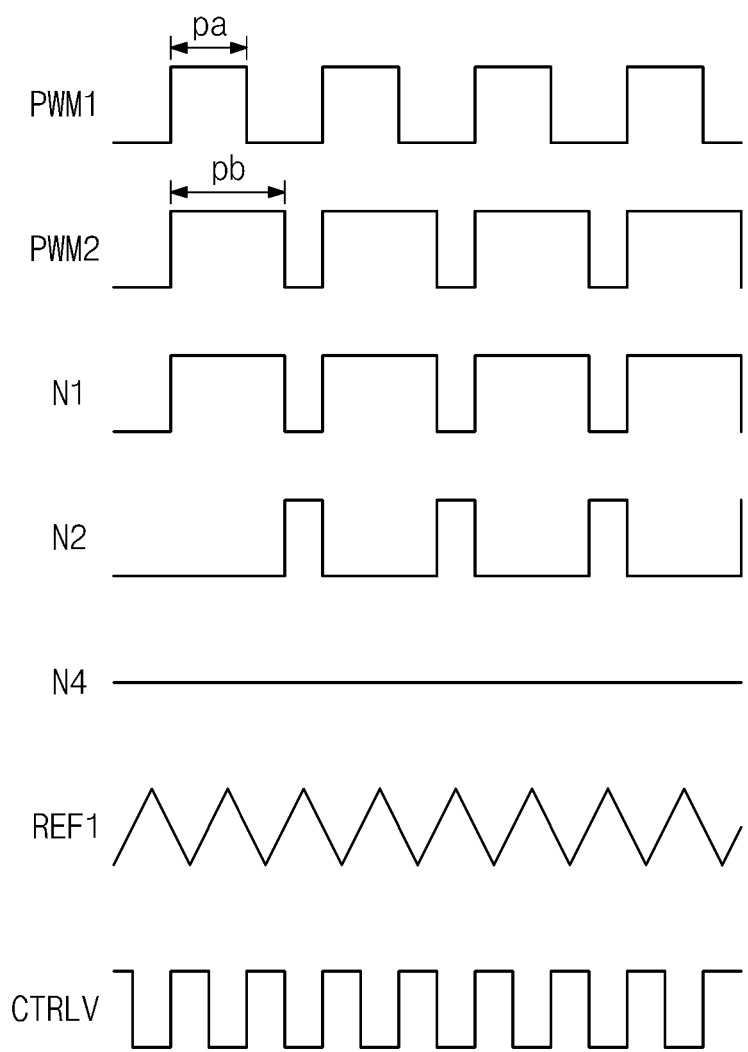
FIG. 5 is a waveform diagram showing signals generated by the voltage control signal generator shown in FIG. 4.

FIG. 5 is a waveform diagram showing signals generated by the voltage control signal generator to explain the voltage control signal generator shown in FIG. 4.

Referring to FIGS. 4 and 5, when the pulse width pb of the current control signal PWM2 output from the current controller 138 is greater than the pulse width pa of the current control signal PWM1 output from the current controller 136, the current control signal provided through the diode D2 is applied to the first node N1.

During the high level of the voltage at the first node N1, the transistor T11 is turned on. When the transistor T11 is turned on, the voltage of the second node N2 is transited to the low level. Therefore, the voltage at the second node N2 is set to the high level during the low level of the voltage at the first node N1. During the high level of the voltage at the second node N2, the transistor T12 is turned on and the voltage of the third node N3 is transited to the low level. The transistor T12 is turned off during the low level of the voltage at the second node N2 and the voltage at the third node N3 is transited to a voltage level corresponding to the minimum error voltage LEV. The voltage at the third node N3 is integrated by the resistor R15 and the capacitor C11 and the integrated voltage is input into a non-inverting input terminal (+) of the comparator 210 through the fourth node N4.

The comparator 210 is configured to compare the voltage at the fourth node N4 and a first reference voltage REF1 and to output the voltage control signal CTRLV. The first reference voltage REF1 is a triangular wave or a sawtooth wave.

According to the voltage control signal generator 132, the voltage control signal CTRLV corresponding to a voltage obtained by reducing the voltage level of the mirror error voltage LEV by a period of the low level of the current control signal of the current control signals PWM1 and PWM2, which has a relatively wide pulse width, is output. For instance, the explanation that the low level period exists in the current control signal having the relatively wide pulse width among the current control signals PWM1 and PWM2 means that the voltage level of the light source driving voltage LVDD is too high. Therefore, when the pulse width of the voltage control signal CTRLV is controlled by the voltage level corresponding to the low level period of the current control signal having the relatively wide pulse width among the current control signals PWM1 and PWM2, the voltage level of the light source driving voltage LVDD may be set to a minimum level.

Figure 6:
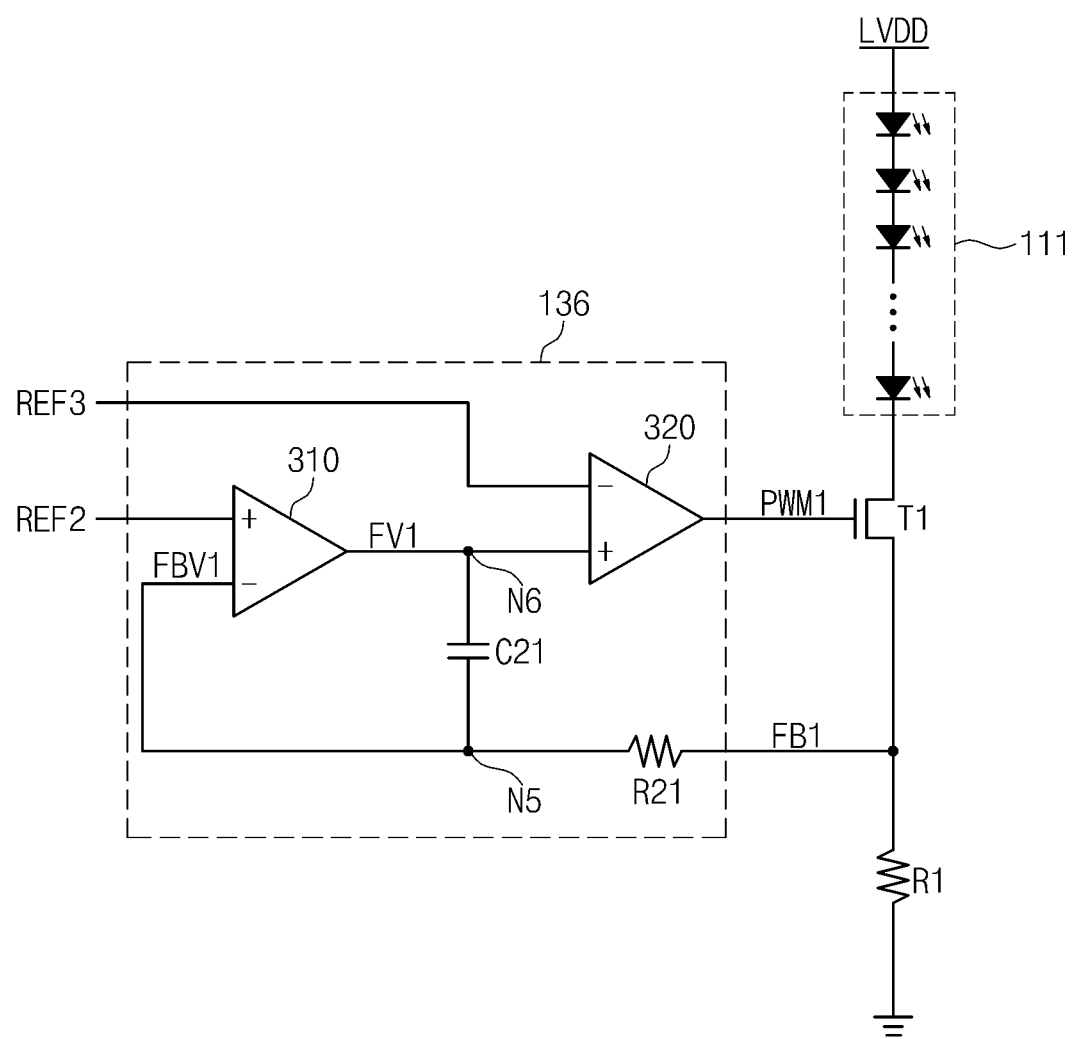
FIG. 6 is a circuit diagram showing the current controller shown in FIG. 4.

FIG. 6 is a circuit diagram showing the current controllers 136 shown in FIG. 4. FIG. 6 shows only the configuration of the current controller 136, but the current controller 138 may have the same configuration as the current controller 136.

Referring to FIG. 6, the current controller 136 includes a resistor R21, a capacitor C21, and comparators 310 and 320. The resistor R21 is connected between the resistor R1 and a fifth node N5. The capacitor C21 is connected between the fifth node N5 and a sixth node N6. The comparator 310 is configured to receive a voltage of the fifth node N5 and a second reference voltage REF2 and to output a feedback voltage FV1 to the sixth node N6. The comparator 320 is configured to receive the feedback voltage FV1 of the sixth node N6 and a third reference voltage REF3 and to output the current control signal PWM1.

Figure 7:
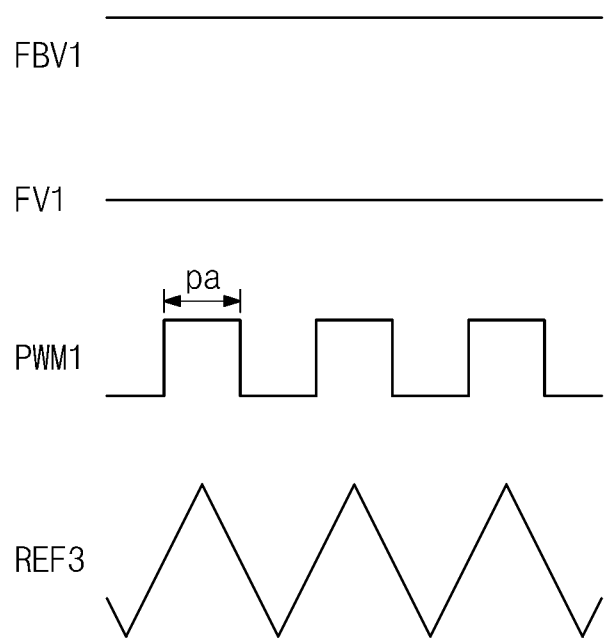
FIG. 7 is a waveform diagram showing signals generated by the current controller shown in FIG. 6.

FIG. 7 is a waveform diagram showing signals generated by the current controller shown in FIG. 6.

Referring to FIG. 7, the feedback signal FB1 at the end of the resistor R1 becomes a direct current voltage FBV1 by the interaction of the capacitor C21 and the resistor R21. The comparator 310 is configured to compare the second reference voltage REF2, which is a direct current voltage, and the direct current voltage FBV1 to output the feedback voltage FV 1. The comparator 320 is configured to compare the feedback voltage FV1 and the third reference voltage REF3 to output the current control signal PWM1. The third reference voltage REF3 is a triangular wave or a sawtooth wave.

As the pulse width pa of the current control signal PWM1 increases, the turn-on period of the transistor T1 lengthens. Therefore, the amount of the current flowing through the LED string 111 is increased. As the pulse width pa of the current control signal PWM1 decreases, the turn-on period of the transistor T1 shortens. Therefore, the amount of the current flowing through the LED string 111 is decreased. As described above, the current flowing through the LED string 111 is controlled by changing the pulse width pa of the current control signal PWM1, and thus the brightness of the LED string 111 may be controlled.

Figure 8:
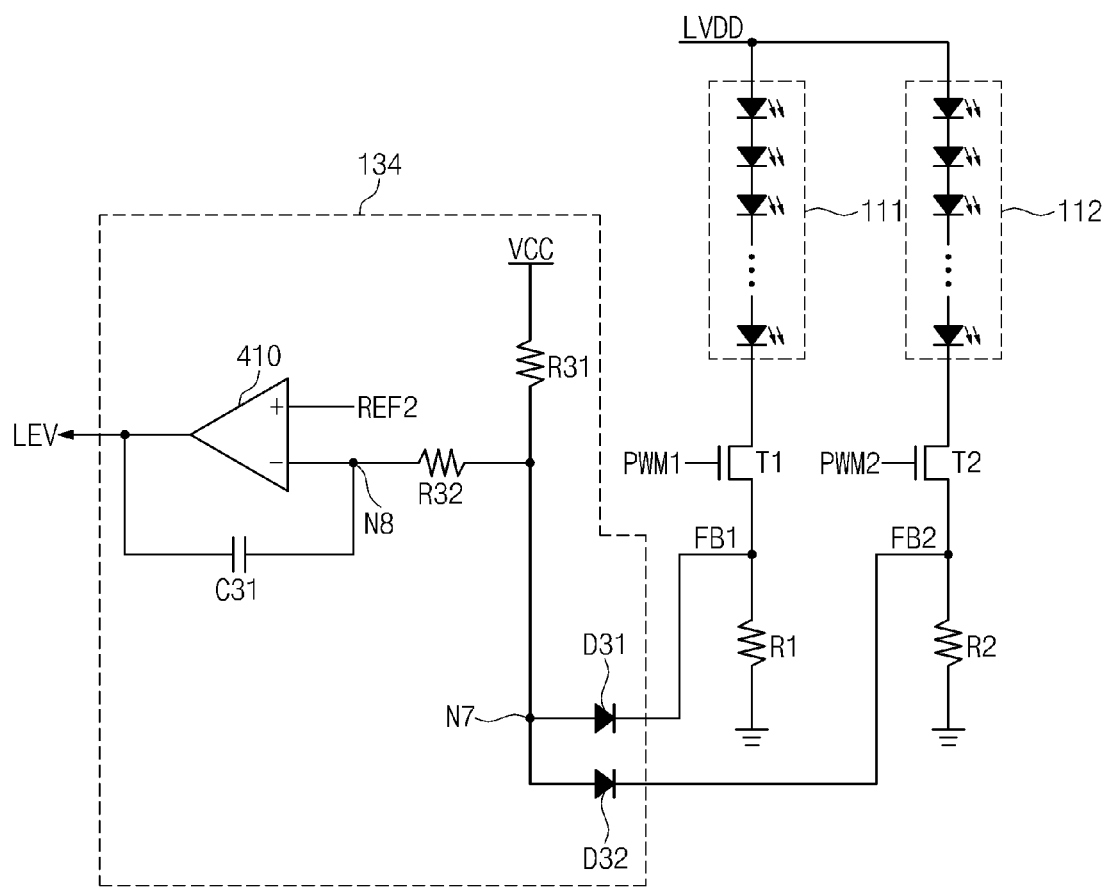
FIG. 8 is a circuit diagram showing the minimum error voltage generator shown in FIG. 4.

FIG. 8 is a circuit diagram showing the minimum error voltage generator 134 shown in FIG. 4.

Referring to FIG. 8, the minimum error voltage generator 134 includes diodes D31 and D32, resistors R31 and R32, a capacitor C31, and a comparator 410. The diode D31 includes a cathode terminal connected to the end of the resistor R1 and the diode D32 includes a cathode terminal connected to the end of the resistor R2. Anode terminals of the diodes D31 and D32 are both connected to a seventh node N7. The resistor R31 is connected between a source voltage VCC and the seventh node N7. The resistor R32 is connected between the seventh node N7 and an eighth node N8. The comparator 410 is configured to receive a voltage at the eighth node N8 and the second reference voltage REF2 and to output the minimum error voltage LEV. The capacitor C31 is connected between the eighth node N8 and an output terminal of the comparator 410.

A voltage at the seventh node N7 has a voltage level corresponding to a relatively lower voltage level of the feedback signals FB1 and FB2 at the ends of the resistors R1 and R2. For example, when the voltage level of the feedback signal FB1 is lower than the voltage level of the feedback signal FB2, a current path is formed through the resistor R31 and the diode D31. Therefore, the voltage level of the voltage at the seventh node N7 is set to the voltage level of the feedback signal FB1.

The voltage of the eighth node N8 corresponds to a voltage obtained by integrating the voltage of the seventh node N7 by using the resistor R32 and the capacitor C31. A difference between the second reference voltage REF2, which is a direct current voltage, and the voltage of the eighth node N8 is output as the minimum error voltage LEV. Therefore, the minimum error voltage generator 134 may generate the minimum error voltage LEV corresponding to the feedback signal having the relatively lower voltage level of the feedback signals FB1 and FB2. The minimum error voltage LEV is applied to the end of the resistor R14 is shown in FIG. 4.

Figure 9:
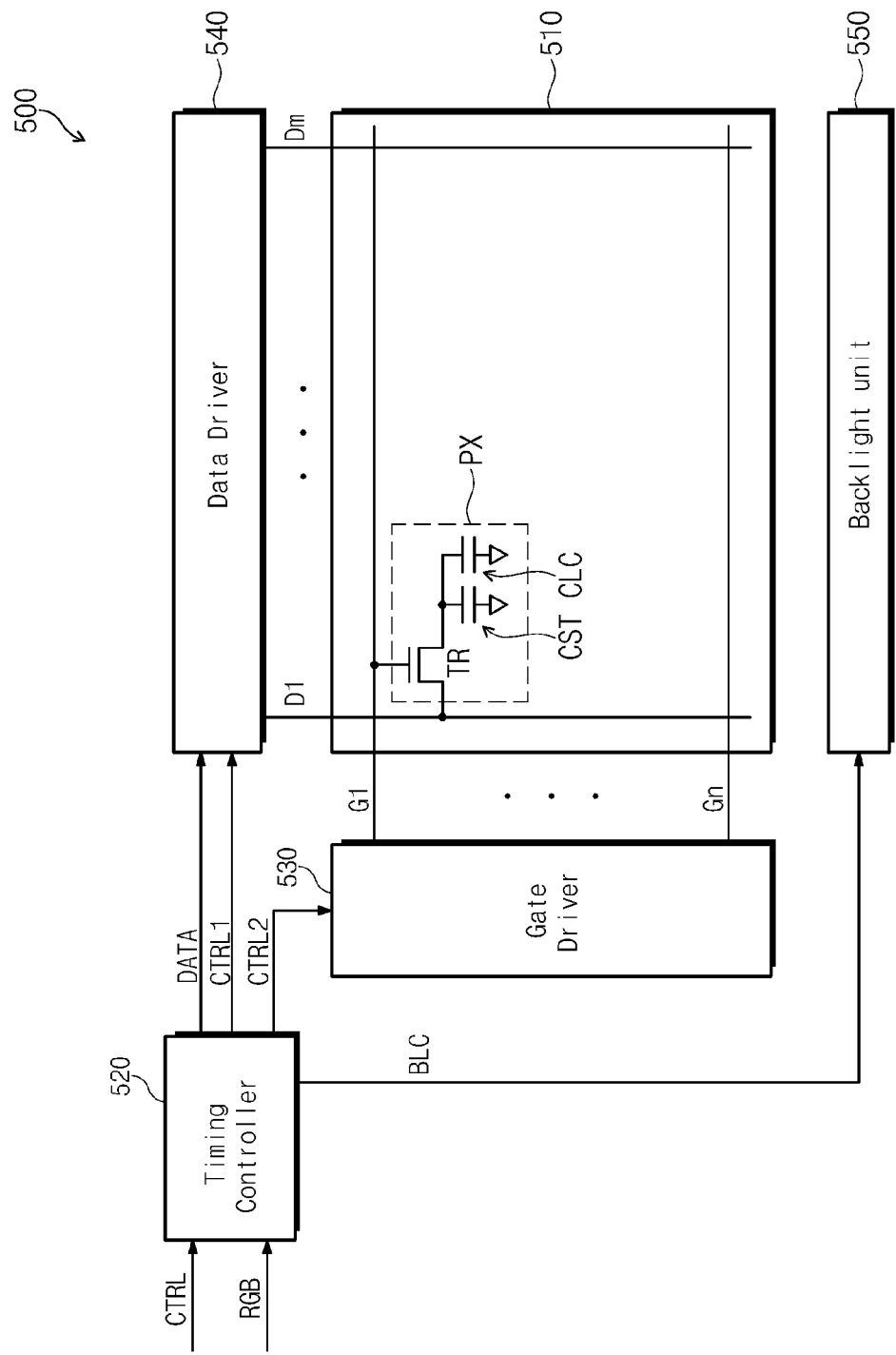
FIG. 9 is a block diagram showing a display device including the backlight unit according to an exemplary embodiment of the present invention.

FIG. 9 is a block diagram showing a display device including the backlight unit according to an exemplary embodiment of the present disclosure. Hereinafter, a liquid crystal display will be described as the display device, but the display device is not limited to the liquid crystal display.

Referring to FIG. 9, a display device 500 includes a display panel 510, a timing controller 520, a gate driver 530, a data driver 540, and a backlight unit 550.

The display panel 510 includes a plurality of data lines D1 to Dm, a plurality of gate lines G1 to Gn crossing the data lines D1 to Dm, and a plurality of pixels PX arranged in areas defined by the data lines D1 to Dm and the gate lines G1 to Gn. The data lines D1 to Dm are insulated from the gate lines G1 to Gn.

Each pixel PX includes a switching transistor TR connected to a corresponding data line of the data lines D1 to Dm and a corresponding gate line of the gate lines G1 to Gn, a liquid crystal capacitor CLC connected to the switching transistor TR, and a storage capacitor CST connected to the switching transistor TR.

The timing controller 520, the gate driver 530, and the data driver 540 are configured to operate as a driving circuit to control the display panel 510, and thus the image is displayed on the display panel 510.

The timing controller 520 is configured to receive image signals RGB and control signals CTRL used to control the image signals RGB, such as a vertical synchronization signal, a horizontal synchronization signal, a main clock signal, a data enable signal, etc., from an external device (not shown). The timing controller 520 is configured to process the image signals RGB appropriate to an operation condition of the display panel 510 on the basis of the control signals CTRL to output an image data signal DATA. The timing controller 520 is configured to apply the image data signal DATA and a first control signal CTRL1 to the data driver 540 and to apply a second control signal CTRL2 to the gate driver 530. The first control signal CTRL1 includes a start pulse signal, a clock signal, a polarity inverting signal, and a line latch signal (not shown) and the second control signal CTRL2 includes a vertical synchronization start signal, an output enable signal, and a gate pulse signal (not shown).

The gate driver 530 is configured to drive the gate lines G1 to Gn in response to the second control signal CTRL2 from the timing controller 520. The gate driver 530 is configured as a gate driver integrated circuit or as a circuit using oxide semiconductor, amorphous semiconductor, crystalline semiconductor, or polycrystalline semiconductor.

The data driver 540 is configured to output gray-scale voltages in response to the image data signal DATA and the first control signal CTRL1 from the timing controller 520 to drive the data lines D1 to Dm.

When a gate on voltage is applied to one gate line by the gate driver 530, switching transistors TR arranged in one row and connected to the one gate line are turned on. In this case, the data driver 540 is configured to provide the gray-scale voltages corresponding to the image data signal DATA to the data lines D1 to Dm. The gray-scale voltages applied to the data lines D1 to Dm are applied to corresponding liquid crystal capacitors CLC and corresponding storage capacitors CST through the turned-on switching transistors TR.

The backlight unit 550 is configured to provide the light to the display panel 510. The display panel 510 is configured to display the image using the light from the backlight unit 550.

The backlight unit 550 is configured to be operated in response to a backlight control signal BLC from the timing controller 520. The backlight unit 550 is configured to control the brightness in response to the backlight control signal BLC from the timing controller 520 and to change on and off periods thereof in response to the backlight control signal BLC from the timing controller 520.

The backlight unit 550 included in the display device 500 is configured to control the voltage level of the light source driving voltage applied to the LED strings with reference to the LED string having lowest forward driving voltage among the LED strings. Because the voltage level of the light source driving voltage may be set to the minimum level required to drive the LED strings, the power consumption in the backlight unit 550 may be reduced. Consequently, the power consumption of the display device 500 may be reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight unit comprising:
   a power converter configured to generate a light source driving voltage in response to a voltage control signal;
   a plurality of light emitting diode strings, each of the plurality of light emitting diode strings configured to receive the light source driving voltage through an end thereof; and
   a controller connected to the other ends of each of the plurality of light emitting diode strings configured to generate a plurality of current control signals to control a current flowing through each light emitting diode string and the voltage control signal,
   wherein:
   the controller comprises a voltage control signal generator configured to generate the voltage control signal corresponding to a current control signal having a widest pulse width from among the plurality of current control signals, that is applied to a light emitting diode string having a lowest forward driving voltage among the plurality of light emitting diode strings; and
   the pulse width of each current control signal corresponds to the forward driving voltage of the corresponding light emitting diode string of the plurality of light emitting strings.

2. The backlight unit of claim 1, wherein the controller comprises a plurality of current controllers respectively corresponding to the plurality of light emitting diode strings, each of the plurality of current controllers being connected to the other end of the corresponding light emitting diode string of the plurality of light emitting diode strings, and configured to generate the current control signal to control the current flowing through the corresponding light emitting diode string.

3. The backlight unit of claim 2, wherein the voltage control signal generator is configured to receive the current control signals applied to the plurality of light emitting diode strings from the plurality of current controllers.

4. The backlight unit of claim 3, wherein the voltage control signal generator comprises:
   a plurality of diodes each comprising a first terminal connected to a corresponding current control signal of the plurality of current control signals and a second terminal;
   a first resistor connected between a first node connected to the second terminal of each of the plurality of diodes and a source voltage;
   a second resistor connected between the first node and a ground voltage;
   a third resistor connected between the source voltage and the second node;
   a first transistor connected between the second node and the ground voltage, the first transistor comprising a gate electrode connected to the first node;
   a fourth resistor connected between a minimum error voltage and a third node;
   a second transistor connected between the third node and the ground voltage, the second transistor comprising a gate electrode connected to the second node;
   a fifth resistor connected between the third node and a fourth node;
   a capacitor connected between the fourth node and the ground voltage; and
   a first comparator configured to receive a first reference voltage and a voltage of the fourth node and to output the voltage control signal.

5. The backlight unit of claim 4, wherein the first reference voltage is a triangular wave or a sawtooth wave.

6. The backlight unit of claim 5, further comprising:
   a plurality of pull-down resistors, each of the plurality of pull-down resistors comprising a first end and a second end, the first end being connected to the ground voltage; and
   a plurality of transistors, each of the plurality of transistors comprising a first end connected to the other end of the corresponding light emitting diode string of the plurality of light emitting diode strings, a second end connected to the second end of a corresponding pull-down resistor of the plurality of pull-down resistors, and a gate electrode connected to the corresponding current control signal among the plurality of current control signals.

7. The backlight unit of claim 6, wherein each of the current controllers comprises:
   a resistor connected between the first end of the corresponding pull-down resistor of the pull-down resistors and a fifth node;
   a second comparator configured to receive a voltage of the fifth node and a second reference voltage to output an error voltage to a sixth node;
   a capacitor connected between the fifth node and the sixth node; and
   a third comparator configured to receive the voltage of the fifth node and a third reference voltage to output the current control signal.

8. The backlight unit of claim 7, wherein the third reference voltage is a triangular wave or a sawtooth wave.

9. The backlight unit of claim 6, wherein the controller further comprises a minimum error voltage generator connected to the second end of each of the pull-down resistors and configured to generate the minimum error voltage.

10. The backlight unit of claim 9, wherein the minimum error voltage generator comprises:
    a plurality of diodes respectively corresponding to the resistors and comprising a cathode terminal connected to the first end of the corresponding resistor of the plurality of resistors and an anode terminal;
    a sixth resistor connected between the source voltage and a seventh node;
    a seventh resistor connected between the seventh node and an eighth node; and
    a fourth comparator configured to receive a voltage of the eighth node and the second reference voltage to output the minimum error voltage.

11. A display device comprising:
    a display panel comprising a plurality of pixels;
    a driving circuit configured to control the display panel such that an image is displayed on the display panel; and a backlight unit configured to supply a light to the display panel, the backlight unit comprising:
   a power converter configured to generate a light source driving voltage in response to a voltage control signal;
   a plurality of light emitting diode strings configured to receive the light source driving voltage through an end of each of the plurality of light emitting diode strings; and
   a controller connected to the other end of each of the plurality of light emitting diode string and configured to generate a plurality of current control signals to control a current flowing through each of the plurality of light emitting diode strings and the voltage control signal,
wherein:
the controller comprises a voltage control signal generator configured to generate the voltage control signal corresponding to a current control signal having a widest pulse width from among the plurality of current control signals, that is applied to a light emitting diode string having a lowest forward driving voltage among the plurality of light emitting diode strings; and
the pulse width of each current control signal corresponds to the forward driving voltage of the corresponding light emitting diode string of the plurality of light emitting strings.

12. The display device of claim 11, further comprising:
a plurality of pull-down resistors, each of the plurality of pull-down resistors comprising a first end and a second end, the first end being connected to ground; and
a plurality of transistors, each of the plurality of transistors comprising a first end connected to the other end of the corresponding light emitting diode string of the plurality of light emitting diode strings, a second end connected to the second end of a corresponding pull-down resistor of the plurality of pull-down resistors, and a gate electrode connected to the corresponding current control signal among the plurality of current control signals.

13. The display device of claim 12, wherein the controller further comprises a plurality of current controllers respectively corresponding to the plurality of pull-down resistors, each of the plurality of current controllers being connected to an end of the corresponding pull-down resistor of the plurality of pull-down resistors, and configured to generate the current control signal applied to the gate electrode of a corresponding transistor of the plurality of transistors.

14. The display device of claim 13, wherein the voltage control signal generator is configured to receive the plurality of current control signals applied to the gate electrode of the plurality of transistors from the plurality of current controllers.

15. The display device of claim 14, wherein the voltage control signal generator comprises:
   a plurality of diodes, each of the plurality of diodes comprising a first terminal connected to a corresponding current control signal of the plurality of current control signals and a second terminal;
   a first resistor connected between a first node connected to the second terminal of each of the plurality of diodes and a source voltage;
   a second resistor connected between the first node and a ground voltage;
   a third resistor connected between the source voltage and the second node;
   a first transistor connected between the second node and ground, the first transistor comprising a gate electrode connected to the first node;
   a fourth resistor connected between a minimum error voltage and a third node;
   a second transistor connected between the third node and the ground voltage, the second transistor comprising a gate electrode connected to the second node;
   a fifth resistor connected between the third node and a fourth node;
   a capacitor connected between the fourth node and ground; and
   a first comparator configured to receive a first reference voltage and a voltage of the fourth node and to output the voltage control signal.

16. The display device of claim 13, wherein the controller further comprises a minimum error voltage generator connected to an end of each of the plurality of pull-down resistors and configured to generate the minimum error voltage, and the minimum error voltage generator comprising:
   a plurality of diodes respectively corresponding to the plurality of resistors, each of the plurality of diodes comprising a cathode terminal connected to the first end of the corresponding resistor of the plurality of resistors and an anode terminal;
   a sixth resistor connected between the source voltage and a seventh node;
   a seventh resistor connected between the seventh node and an eighth node; and
   a fourth comparator configured to receive a voltage of the eighth node and the second reference voltage and to output the minimum error voltage.

17. The display device of claim 15, wherein each of the plurality of current controllers comprises:
   a resistor connected between the first end of the corresponding pull-down resistor of the plurality of pull-down resistors and a fifth node;
   a second comparator configured to receive a voltage of the fifth node and a second reference voltage and to output an error voltage to a sixth node;
   a capacitor connected between the fifth node and the sixth node; and
   a third comparator configured to receive the voltage of the fifth node and a third reference voltage and to output the current control signal.

18. The display device of claim 17, wherein each of the first reference voltage and the third reference voltage is a triangular wave or a sawtooth wave.

* * * * *